United States Patent
Buchs et al.

(10) Patent No.: US 6,467,729 B2
(45) Date of Patent: Oct. 22, 2002

(54) METHOD AND ARRANGEMENT FOR CONTROLLING THE CLOSING AND OPENING OPERATION OF A PASSENGER DOOR OF AN AIRCRAFT

(75) Inventors: Wolfgang Buchs, Oberndorf; Frank Uhlmann, Buehl, both of (DE)

(73) Assignee: Eurocopter Deutschland GmbH, Donauwoerth (DE)

( * ) Notice: Subject to any disclaimer, the term of this patent is extended or adjusted under 35 U.S.C. 154(b) by 0 days.

(21) Appl. No.: 09/991,009

(22) Filed: Nov. 16, 2001

(65) Prior Publication Data

US 2002/0060270 A1 May 23, 2002

(30) Foreign Application Priority Data

Nov. 17, 2000 (DE) .......................................... 100 56 994

(51) Int. Cl.$^7$ ................................................. B64C 1/14
(52) U.S. Cl. ........................ 244/129.5; 49/254; 49/208
(58) Field of Search ........................... 244/129.5, 129.4; 49/254, 250, 208

(56) References Cited

U.S. PATENT DOCUMENTS

| | | | |
|---|---|---|---|
| 3,051,280 A | 8/1962 | Bergman et al. | 244/129.5 |
| 3,085,297 A | 4/1963 | Linderfelt | 244/129.5 |

(List continued on next page.)

FOREIGN PATENT DOCUMENTS

| | | |
|---|---|---|
| DE | 4022067 | 1/1992 |
| DE | 19702084 | 2/1998 |
| EP | 0317037 | 5/1989 |
| EP | 0321994 | 6/1989 |
| EP | 0465785 | 1/1992 |
| EP | 0597418 | 5/1994 |
| GB | 2332705 | 6/1999 |

OTHER PUBLICATIONS

U. S. Patent Application 09/845,530, filed on Apr. 30, 2001, Hannes Erben et al.; entitled: Method and Device for Closing the Door of an Aircraft; pp. 1 to 22 and 4 sheets of drawings.
U. S. Patent Application 09/919,311, filed on Jul. 31, 2001, Hannes Erben et al.; entitled: Control for a Passenger Door of an Aircraft; pp. 1 to 19 and 1 drawing sheet.

*Primary Examiner*—J. Woodrow Eldred
(74) *Attorney, Agent, or Firm*—W. F. Fasse; W. G. Fasse (57) ABSTRACT

An arrangement for controlling the closing and opening operation of an aircraft passenger door includes electromechanical actuators and manual actuators for moving the door and for actuating the various latching and locking mechanisms of the door, a door control unit, as well as an actuator control unit, an operating console, and sensors that sense position and status conditions of the door, all connected to the door control unit, a power supply, and power switches connected serially between the power supply and the actuator control unit. In an operating method, the door control unit controls the actuator control unit, and can switch all of the individual function steps for opening or closing the door selectively between being manually controlled and being electromechanically controlled. While the door can be actuated electrically, in the case of a malfunction or if desired by the operator, it can be operated fully or partly mechanically under a manual control.

20 Claims, 2 Drawing Sheets

U.S. PATENT DOCUMENTS

| | | | |
|---|---|---|---|
| 3,791,073 A | 2/1974 | Baker | 42/249 |
| 4,180,287 A | 12/1979 | Youngblood et al. | 244/129.5 |
| 4,473,201 A | 9/1984 | Barnes et al. | 244/129.5 |
| 4,482,113 A | 11/1984 | Backlund et al. | 244/129.5 |
| 4,497,462 A | 2/1985 | Hamatani | 244/129.5 |
| 4,680,891 A | 7/1987 | Perkins | 244/129.5 |
| 4,720,065 A | 1/1988 | Hamatani | 244/129.5 |
| 4,915,326 A | 4/1990 | Plude | 244/129.5 |
| 5,163,639 A | 11/1992 | Herrmann et al. | 244/129.5 |
| 5,251,851 A | 10/1993 | Herrmann et al. | 244/129.5 |
| 5,289,615 A | 3/1994 | Banks et al. | 244/129.5 |
| 5,305,969 A | 4/1994 | Odell et al. | 244/129.5 |
| 5,613,716 A | 3/1997 | Cafferty | 244/129.5 |
| 5,636,814 A | 6/1997 | Rollert | 244/129.5 |
| 5,667,169 A | 9/1997 | Erben et al. | 244/129.5 |
| 5,735,487 A | 4/1998 | Abild et al. | 244/129.5 |
| 5,823,473 A | 10/1998 | Odell et al. | 244/129.5 |
| 5,848,575 A | 12/1998 | Freeman et al. | 244/129.5 |
| 5,881,973 A * | 3/1999 | Agajanian et al. | 244/129.5 |
| 5,984,234 A * | 11/1999 | Brouwer et al. | 244/129.5 |
| 6,109,563 A | 8/2000 | Verhoeven et al. | 244/129.5 |
| 6,158,692 A | 12/2000 | Abild et al. | 244/129.5 |
| 6,168,114 B1 * | 1/2001 | Erben | 244/129.5 |

* cited by examiner

METHOD AND ARRANGEMENT FOR CONTROLLING THE CLOSING AND OPENING OPERATION OF A PASSENGER DOOR OF AN AIRCRAFT

PRIORITY CLAIM

This application is based on and claims the priority under 35 U.S.C. §119 of German Patent Application 100 56 994.3 filed on Nov. 17, 2000, the entire disclosure of which is incorporated herein by reference.

FIELD OF THE INVENTION

The invention concerns a method and an arrangement for controlling the closing and opening operation of a passenger door of an aircraft, comprising a control mechanism with at least one control unit for the actuators for moving the door and for moving the closing and opening means, the door being arranged movably on a support arm and the support arm being pivoted around an axis fixed to the aircraft fuselage.

BACKGROUND INFORMATION

According to German Patent DE 197 02 084 C1 a passenger door of an aircraft is movable from an open position to a closed position. From the closed position the door is brought into a latching state whereby the door is latched in the fuselage structure by means of a latching mechanism. More recent developments go further toward a locking of the latching mechanism. The kinematics of the door can only be activated by mechanical means (e.g. hand levers).

European Patent EP 0 465 785 B1 describes the state of the art for moving an aircraft door by means of electric motors as actuators. It concerns a passenger door which is swivellable around an axis fixed to the fuselage by means of a support arm. The known solution has the objective of making possible an automatic actuation of the door wherein the required movements must be able to be carried out precisely, and mechanically effective elements such as bearings, shafts and levers are to be largely omitted. According to the known solution, all the motions of the door can be carried out by means of electric motors. The motors are controlled with the aid of suitable stored programs which coordinate the different functions of the electric motors. The solution allows separate, storable programs for each individual electric motor. This solution has the disadvantage that it cannot be detected whether an individual motor has carried out the positioning action precisely and completely. If one electric motor fails, then the door cannot be opened or closed.

SUMMARY OF THE INVENTION

It is an object of the invention to improve the closing and opening operation of an electrically actuated passenger door and to make the operation more convenient and safer. The invention further aims to avoid or overcome the disadvantages of the prior art, and to achieve additional advantages, as apparent from the present specification.

The above objects have been achieved according to the invention in a door system of an aircraft especially including an arrangement for controlling the closing and opening operation of the aircraft door, with a particular control system. According to the invention, the door system includes a door movably arranged relative to a door opening of the aircraft fuselage, a latching mechanism adapted to selectively latch and unlatch the door, a locking mechanism adapted to selectively lock and unlock the latched state of the door, electromechanical actuators (e.g. electric motors, linear actuators, solenoids, etc. as well as mechanical transmission elements and linkages) adapted to move the door and to actuate the latching mechanism and the locking mechanism, manual actuators (e.g. manually operable levers, cranks, knobs, handles or the like, as well as mechanical transmission elements and linkages) adapted to move the door and to actuate the latching mechanism and the locking mechanism, an actuator control unit connected to the electromechanical actuators to transmit control signals thereto, a door control unit connected for signal and data exchange with the actuator control unit, plural sensors connected for signal transmission to the door control unit, an operating console connected for signal and data exchange with the door control unit, a power supply source connected to supply power to the actuator control unit, and first and second power switches connected in series between the power supply source and the actuator control unit.

The sensors are arranged and adapted to sense the status of various components or subsystems of the door system, and to provide data regarding the sensed status to the door control unit. The power switches selectively control the supply of power to the actuator control unit, and thereby to the actuators. If either one of the power switches is opened, then the supply of power to the actuators will be cut off. Preferably according to the invention, the various components or subsystems of the door system, and the functional steps of an operating sequence for closing or opening the door, can be selectively operated either electromechanically (using the electromechanical actuators) or manually (using the manual actuators).

The above objects have further been achieved according to the invention in a method of controlling a closing and opening operation of a door system, generally as described above. The method generally involves steps of moving the door from an open position to a closed position, latching the door, and locking the door in a closing operation, as well as unlocking the door, unlatching the door, and then moving the door from the closed position into an open position in an opening operation. Especially according to the invention, the door control unit controls the performance of each one of the above steps for opening or closing the door, and selectively enables any selected one or more of those steps to be carried out either electromechanically or manually, i.e. by means of the electromechanical actuators or by means of the manual actuators.

More particularly, the electromechanical actuators are controlled essentially by at least one control unit. It is also possible to provide or form a plurality of control units for the actuators. These one or more control units for the actuators are controlled by a door control unit. For reasons of simplification only one actuator control unit for the actuators will be referred to frequently hereinafter, although alternatively a plurality of them can exist. In addition to controlling the actuator control unit or units, the door control unit has further control functions. The door control unit can optionally switch all or individual function steps between a mechanical control of the door and an electromechanical control of the door as mentioned above. A further control function serves to control testing of the security of the door. In addition, the door control unit can be controlled by manual command input by means of the operating console or consoles arranged on the door.

The invention succeeds in combining the proven high operating safety of a conventional, modern aircraft door with the operating convenience of a completely electromechanical door. An important advantage of this combination is that while the door is essentially actuatable electrically, in the case of malfunction or if desired by the operator, it can be operated essentially mechanically, or partly mechanically and partly electrically for different function steps.

According to one embodiment, the door control unit has a stored process program for controlling the function steps of an opening and closing operation.

The testing of the security of the door controlled by the door control unit includes at least a test of the "flight" or "park" status of the aircraft, a test of the "armed" or "disarmed" status of the emergency opening system, and a test of the "flight locked" or "flight unlocked" status of a hand lever. Such a door security testing procedure can, of course, also include a test of the "retracted" or "extended" status of the boarding stairway.

According to a further embodiment, the door control unit can control the opening and closing means of a locking mechanism of the door depending on the respective position of an operating hand lever.

According to another embodiment of the invention, the power status of the actuator control units can be monitored and controlled. Such monitoring takes place dependent on the status of the emergency opening system and the status of the aircraft. Signals corresponding to these two status indications are supplied to at least two switching means for switching the power supply to the actuators. If the emergency opening system in the "armed" state or the onboard system of the aircraft in the "flight" state supplies a signal to a switching means in the power line of the actuator control units, then the switching means is opened. When the switching means is opened, the actuator control units are without current. This prevents manipulation of the door control during flight.

According to another embodiment, the door control unit can be controlled by means of command inputs via an operating console. The operating console additionally has a display, so that different states of the door can be displayed on the display by means of an input command. This concerns a display of the open position of the door, of the closed position of the door with a locked latching mechanism, of the "on" or "off" status of the power supply, of the flight locked or flight unlocked state of the exterior hand lever, and of a fault in the control system.

According to a further embodiment, the process program has a switch-over program. The switch-over program enables the door control unit to switch from electromechanical control of the function steps to manual control of the function steps or vice versa. Such a switching can be initiated, for example, by a command input via an operating console with respect to the swith-over program. The switch-over program cooperates with the process program in order to achieve the switching at desired function steps. The switch-over program is advantageously a subprogram of the process program. In this way a switching by means of the switch-over program could also be achieved by a programming change in the process program.

In the context of the apparatus or arrangement according to the invention, at least one actuator control unit is connected for signal and data exchange to a door control unit. The door control unit is connected to sensors and is connected to operating consoles by means of a signal and data link. In addition, the door control unit is connected to a power supply source, and the power supply lines of the actuators and/or actuator control units are switchable by switching means arranged in series with respect to each other. Sensors are used for detecting the final positions of the swivelling movement of the door, for detecting the final positions when raising or lowering the door, for detecting the locking or release of the latching mechanism of the door, for detecting the locking or unlocking of the flight locking mechanism for the exterior hand lever, for detecting the locking or unlocking of the superior locking or securing mechanism for the interior door lever, for detecting the arming or disarming of the emergency opening system, and for detecting the "retracted" or "extended" status of a boarding stairway.

A control means located in the power line for the actuators or for actuator control units is controllable from an operating console or a control system in the onboard system of the aircraft. Another switching means is controllable by signals from the sensor of an emergency opening system.

Further in the arrangement according to the invention, the door control unit has a process program stored therein for controlling the function steps of a closing and opening operation. The process program contains a switch-over program which can be called up to enable a switch between manual and electromechanical control or vice versa.

BRIEF DESCRIPTION OF THE DRAWINGS

In order that the invention may be clearly understood, it will now be described in connection with an example embodiment with reference to the accompanying drawings, wherein.

DESCRIPTION OF PREFERRED EXAMPLE EMBODIMENTS AND OF THE BEST MODE OF THE INVENTION

The structure of the passenger door consists essentially of an outer skin fitted flush to the contour of the fuselage and a door frame which is firmly connected to the outer skin. The side of the door frame facing toward the interior of the fuselage is covered by a trim panel or panels. The outer skin of the passenger door forms the flush connection with the surrounding fuselage surface. For reasons of simplicity the term "door" will be used instead of the term "passenger door" hereinafter.

The door is connected via the door frame to a support arm which is pivotable around a vertical axis fixed to the aircraft fuselage and with respect to an axis on the door, so that in its final swivelled-out position the door is located substantially parallel to the outer skin of the fuselage.

Figure 1:
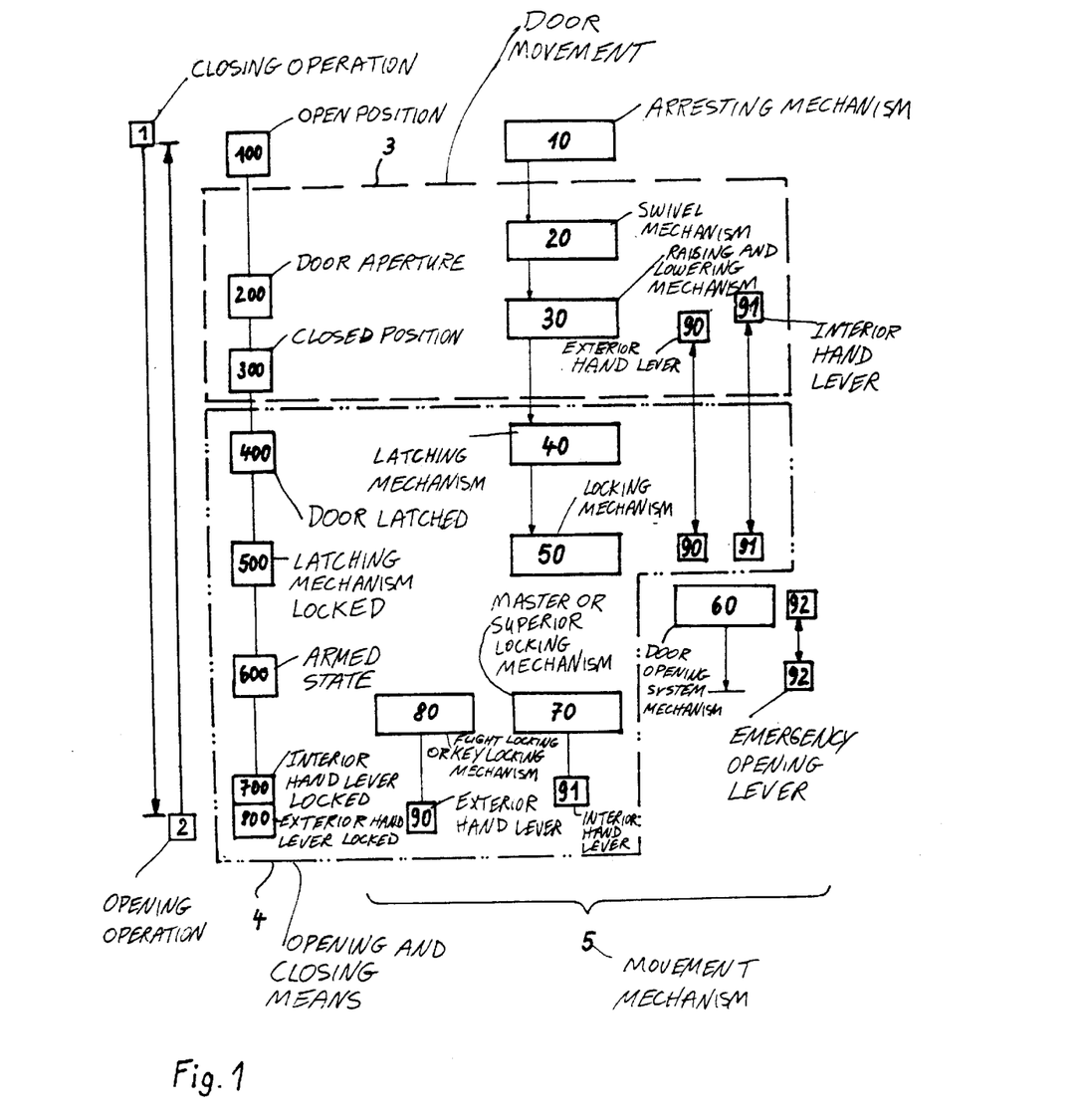
FIG. 1 is a block diagram of function steps for controlling a passenger door according to the invention.

A closing procedure of the passenger door will now be explained with reference to FIG. 1. The passenger door is in the open position 100 and is arrested in this position by an arresting mechanism 10. The closing operation 1 begins with the release of the arresting mechanism 10. To do this the operator can, for example, release an arresting lever. The passenger door thereby becomes swivellable. The operator can then cause the passenger door to swivel from the open position 100 into the door aperture 200 by means of swivel mechanism 20. In this case the operator is in the interior of the cabin. The passenger door has a raising and lowering mechanism 30, hereinafter called lift mechanism for brevity.

If this lift mechanism 30 is actuated as the process continues, the door is lowered into a closed position 300.

The lift mechanism 30 is connected to an exterior hand or manual lever 90 and an interior hand lever 91 of the passenger door. The exterior hand lever 90 is located in a coverable recess in the area of the outer skin and the interior hand lever 91 is located on the inside of the trim paneling of the passenger door. When the closing operation is initiated by an operator in the passenger cabin, the lift mechanism 30 is actuated in that the operator moves the interior hand lever 91 from its starting position, i.e. the operator swings over the interior hand lever 91. The interior hand lever 91 is to be moved from its starting position to an end position. In this process the interior hand lever 91 can move through an arc of, for example, 120°. In being swung over, the interior hand lever 91 reaches an intermediate position (for example, at 105°) which corresponds to a complete lowering of the passenger door into the closed position 300. This brings the "movement of the door" 3 to an end. The necessary further movement of interior hand lever 91 from the intermediate position to the end position causes an actuation of closing means 4. In this movement sector or segment, the latching mechanism 40 is activated by means of the interior hand lever 91. "Latching of the door" 400 is achieved. In addition, a locking mechanism 50, which "locks the latching mechanism" 500, is activated. This brings the interior hand lever 91 to its end position.

In preparing for a start of the aircraft, a so-called superior or master locking mechanism 70 is activated. This activation can be triggered, for example, via an onboard system of the aircraft, so that interior hand lever 91 is finally locked in its already-reached end position by means of "superior locking mechanism 70", i.e. to reach the state "interior hand lever locked" 700.

Another lever 92 on the inside of the door for the emergency opening system is then moved by the operator manually or by means of an actuator controlled by a push button. By the moving of the lever 92 for the emergency opening system from a starting position to an end position, the mechanism 60 of the door opening system is changed from the "disarmed" state to the "armed" state 600. In the "armed" state 600, the emergency slide located in a container in the door is anchored to the floor of the passenger cabin and the emergency opening cylinder is prepared for its function of supporting or assisting the swivelling motion of the door.

A closing operation 1 of the passenger door is additionally provided, for the case when the passengers and crew have left the aircraft and the passenger door must be shut from the outside. In this case, the arresting mechanism 10 must also be released, and the door must be swivelled into the door aperture 200. When the passenger door is located completely in the door aperture, the operator can fully lower the passenger door into closed position 300 by moving the exterior hand lever 90. By moving the exterior hand lever 90 to its end position the latching mechanism 40 is also activated. It latches the door into state 400. The locking mechanism 50 is activated when the fully latched state is reached, so that the door is locked in state 500. Finally, a key locking (or flight locking) mechanism 80, which locks the exterior hand lever 90, is activated, for example, manually by means of a key or electronically by a push-button. The function step "exterior hand lever locked" 800 is thus performed. With the activation of the key locking mechanism 80, the power supply to the door control system can, for example, be cut off.

The exterior hand lever 90 has the peculiarity that it is equipped with a free-running capability whereby the door can be opened from the inside by operating the interior hand lever 91 although the flight locking mechanism 80 was activated, e.g. from the outside. The free-running capability also acts in such a way that in addition to the interior hand lever 91 the exterior hand lever 90 is also locked or f light locked when the superior locking mechanism 70 is activated.

The steps for actuating the individual mechanisms are to be carried out in the reverse sequence when the aircraft is on the ground and an opening operation 2 is necessary.

An opening operation can be performed in accordance with any one of three aspects.

A first aspect considers the opening operation after a normal landing. The lever 92 for the emergency opening system is moved to the "disarmed" position. Then the door can be opened using the interior hand lever 91.

According to a second aspect of the opening operation, a landing has taken place but the emergency opening system is required. The lever 92 for the emergency opening system remains in the "armed" position. The door can then be opened using interior hand lever 91, whereby the emergency devices, such as the emergency evacuation slide, are activated.

According to a third aspect of the opening operation, the aircraft has landed and the door is to be opened using exterior hand lever 90. In this case the emergency opening system is disarmed.

Common to all three aspects is the fact that the start of an opening operation is continued by unlocking the locking mechanism 50, unlatching the latching mechanism 40, and raising the door from the closed position 300 to a position in front of the door aperture. The door can be swivelled manually or electromechanically out of the door aperture into the open position 100, so that it can be arrested in the open position by the arresting mechanism 10.

A closing or opening operation 1, 2 of the door comprises the "moving of door" 3 by means of a swivel mechanism 20 and a lift mechanism 30, and operating the closing and opening means 4. Closing and opening means 4 comprise the arresting mechanism 10, the latching mechanism 40, the locking mechanism 50, the superior or master locking mechanism 70 and the flight locking mechanism 80. These closing and opening means 4, are thus generally also called latching and locking mechanisms, and have movable closing and opening elements, generally mechanically or electromechanically acting means for latching or unlatching, and for locking or unlocking the latching or locking mechanism, together with means for locking and unlocking the flight locking mechanism or the superior locking mechanism.

The movement mechanism 5 of a door is formed by the swivel and lift mechanisms 20, 30, latching mechanism 40, locking mechanism 50, superior locking mechanism 70 and flight locking mechanism 80. It is possible to embody individual mechanisms so that they can be coupled together. For example, the lifting, latching and locking mechanisms could be coupled to form one mechanism operable by one lever, e.g. the interior hand lever or the exterior hand lever. Such a coupling or similar couplings are not, however, a necessary prerequisite for the operation of the invention. The individual mechanisms can be respectively embodied according to any conventional teachings or structures known in the art of aircraft door mechanisms.

A complete closing operation of the door in preparation for the start of the aircraft comprises the following steps:
  release door arrest
  swivel door from open position into door aperture lower door into closed position latch door lock door flight lock door, i.e. lock interior hand lever.

In case the door is closed from outside in preparation for parking the aircraft, the function step:

key lock door, i.e. lock exterior hand lever would alternatively replace the preceding, last step (flight lock door).

The steps are referred to as function steps. It is important that each function step be performed completely. These function steps are performed by the movement mechanism 5 which is coupled to actuators. These actuators generate the necessary force for a positioning action in relation to the movement mechanism 5. The actuators are advantageously controllable electrically or electronically. Each one of the actuators can be respectively embodied according to any conventional teachings or structures known in the actuator art. The actuators can be controlled by individual control units or by combining individual control units to form at least one control unit. The totality of all control units is referred to as the control system.

Figure 2:
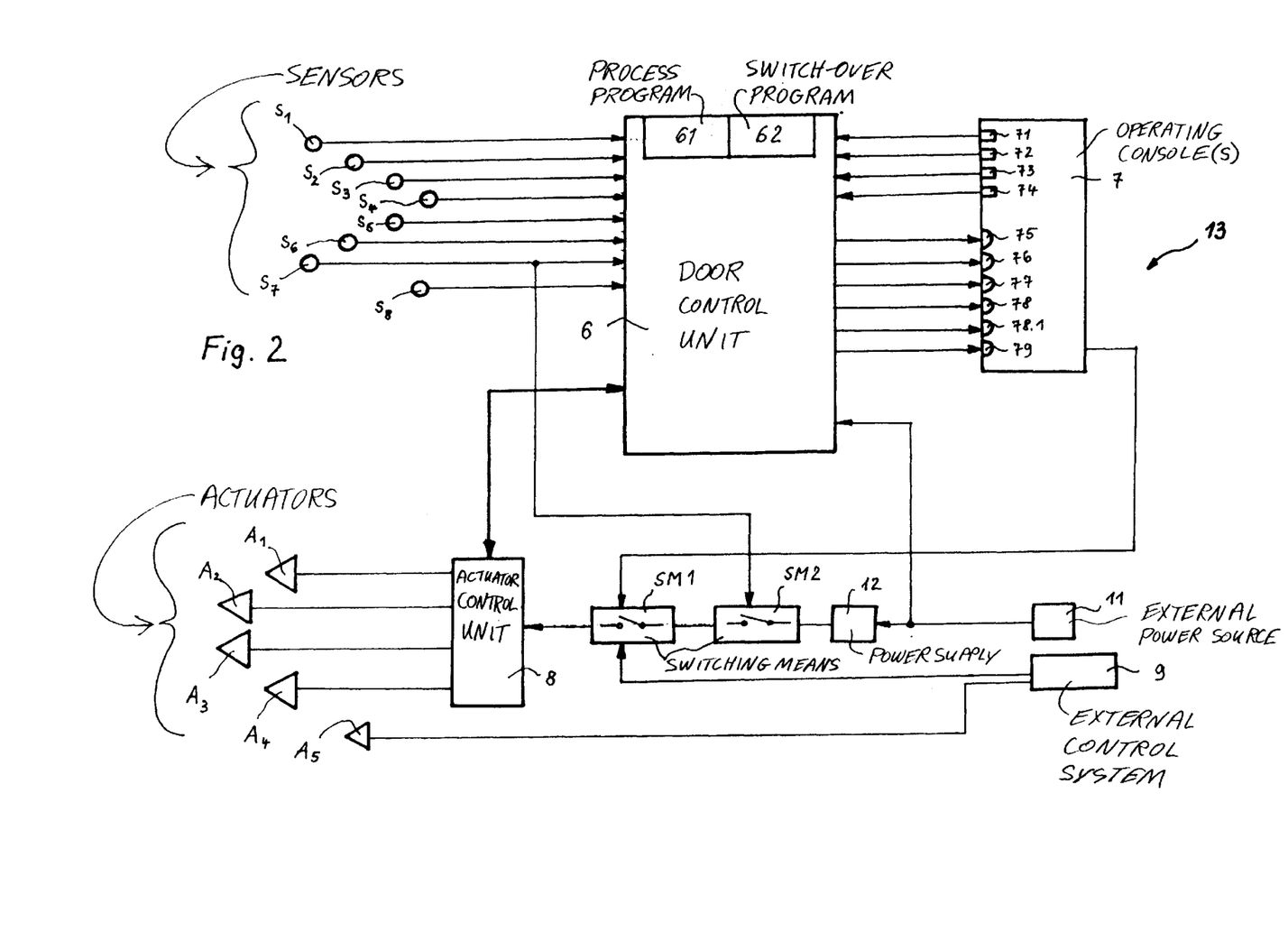
FIG. 2 shows a block diagram of the fundamental structure of an electrical control system for the closing and opening operation of a passenger door.

The attached FIG. 2 shows one example of a fundamental structure of an electrical control system 13 for the closing or opening operation of a passenger door. FIG. 2 shows at least one control unit 8 for actuators, i.e. at least one actuator control unit 8, and a door control unit 6, individual sensors $S_1, S_2, S_3, S_4, S_5, S_6, S_7, S_8$ and actuators $A_1, A_2, A_3, A_4, A_5$, a power supply 12 with an external power source 11, operating consoles, operable both from the inside and from the outside of the door, for the door control unit 6, controllable switching means SM1, SM2 and a possible connection to another, external control system 9. Such a signal and data connection exists between switching means SM1 and the other control system 9. For reasons of simplicity the operating consoles are combined into a single operating console 7 in FIG. 2.

With reference to FIG. 2, a closing operation of the door by means of the control system 13 will now be considered. The abovementioned function steps are controlled sequentially by the control system 13. A process control system is therefore involved. To this end a process program 61 controlling the sequence of function steps is stored in a suitable memory or storage device in the door control unit 6. Only when one function step has been completely executed is the following function step begun.

To control the movement of the door from an open position 100 into a fully closed position with latching and locking of the door in state 700, 800, sensors and actuators are necessary. In the open position 100 the door is arrested by an arresting mechanism 10. If the arresting mechanism 10 is released, the released or arrested state must be sensed by a suitably placed sensor $S_1$ (door arrested/released sensor). Sensor $S_1$, senses that the arresting mechanism 10 is being released. It supplies a corresponding signal to the door control unit 6. The door control unit 6 generates a control command which is transmitted to at least one actuator control unit 8. The actuator control unit 8 supplies a positioning signal to the actuator $A_1$. The actuator $A_1$ can set the swivelling mechanism 20 in motion. The door is therefore swivelled by means of the actuator $A_1$ from the open position 100 into the door aperture 200. The positioning of the door in the door aperture 200 is sensed by means of another sensor $S_2$ (door fully swivelled). This signal in turn generates in the door control unit 6 a control signal which causes the actuator control unit 8 to stop the swivelling of the door by means of the actuator $A_1$. A control signal is then generated which sets the actuator $A_2$ (lock/latch/lift actuator) in motion. The actuator $A_2$ lowers the door into the closed position 300. In its movement, the actuator $A_2$ runs through three movement sections.

The first movement section of the actuator $A_2$ involves lowering the door into the closed position 300. When this position is fully reached, the actuator $A_2$ moves the closing means of the latching mechanism 40 and the locking mechanism 50 by means of a coupling to those mechanisms. In a second movement section of the actuator $A_2$, the door is thus latched 400 by the latching mechanism 40, and in a third movement section of the actuator $A_2$, the door and therefore the latching mechanism 40 is locked 500. The actuator $A_2$ is then in its end position. This end position of actuator $A_2$ in conjunction with the fully lowered door is sensed by a sensor $S_3$ (door locked sensor). A signal is thereby supplied which generates a control signal in door control unit 6, which causes the actuator control unit 8 to stop the actuator $A_2$.

In comparison to a known, mechanically operable door, the movement of the door and the operation of some closing means (or opening means) have been automatically controlled by the electrical control system 13 up to the function step "Lock the latching mechanism" 500. The previous manual movement of an interior door lever has therefore been replaced by an electrical control.

However, the invention assumes that in addition to the electrical control system 13 the mechanical control by means of a hand lever is retained on an equal basis. The moving of a lever on the inner side of the door for the emergency opening system should in principle continue to be carried out manually.

In addition to this fundamental function of electrical control system 13, further closing and opening means can optionally be made electrically controllable, or additional safety or security testing of the door control system or additional monitoring of door states can optionally be installed.

Monitoring of the door serves the purpose of ascertaining whether the door can be moved. For such monitoring four possible alternative monitoring actions are useful. These involve:

1. Testing of the door status, i.e. whether the door is in the "park" or in the "flight" state. For this purpose a sensor $S_6$, which senses the state of the master or superior locking mechanism 70, is appropriately arranged. In the "flight" state, the superior locking mechanism 70 locks the interior hand lever 91. Sensor $S_6$ senses this status of the superior locking mechanism 70 in the "flight" state. In a different case this would correspond to the "park" state. This, too, is sensed by the sensor $S_6$. Sensor $S_6$ sends an appropriate signal to the door control unit 6. Alternatively, the "park" or "flight" states can be tested by an on-board computer via a data line.

2. Testing of the "disarmed" or "armed" status of the emergency opening system. These two states are sensed by sensor $S_7$, which is connected to the emergency opening system. Sensor $S_7$ supplies a corresponding signal to door control unit 6.

3. Testing of the "key locked" or "key unlocked" status of the exterior hand lever 90. Sensor $S_5$ tests this status and likewise sends a signal to the door control unit 6.

4. Testing, characteristic only of the closing operation, whether a set of steps, e.g. a boarding stairway, belonging to the aircraft is "retracted" or "extended". This state of the steps is sensed by sensor $S_8$. It is connected to the mechanism for the steps and is not arranged on the door.

Optionally, the flight locking mechanism 80 and the superior locking mechanism 70 could be activated electromechanically. For this purpose the flight/key locking mechanism 80 can be fitted with an actuator $A_4$ and the superior locking mechanism 70 with an actuator $A_5$. Both actuators $A_4$, $A_5$ may take the form of controllable electric motors or lifting or rotary magnets. The actuator $A_4$ for the key locking mechanism 80 can preferably be coupled to and uncoupled from the key locking mechanism 80. When coupled, actuator $A_4$ locks or unlocks the exterior hand lever 90 by means of a locking mechanism 70. Actuator $A_4$ can be assigned to the electrical door control unit 6. The actuator $A_5$ is preferably a permanent component of the superior locking mechanism 70. Actuator $A_5$ can lock or unlock the interior hand lever 91 by means of the superior locking mechanism 70. Actuator As can be assigned or connected to a control system 9 in the onboard system of the aircraft, e.g. to an onboard computer.

Optionally, an additional monitoring system for door security can be installed. The security monitoring system concentrates on the status of the power supply 12 for the actuators. The security monitoring system decides when the actuators are supplied with power and when their power supply is cut off. Influencing of the power supply to the above-mentioned actuators represents a safety measure which precludes an unintentional activation of any of the actuators. For this purpose two switching means SM1, SM2 can be arranged serially, and the actuators can only be supplied with power when both switching means SM1 and SM2 enable current to flow. This switching logic can, however, also be realized in the form of software which controls only one power switching arrangement. The switching means SM1 is controlled by the two states "flight" or "park". In the "flight" state the switching means is open. The current supply is thereby interrupted. The power supply to the actuators is switched off. In the "park" state the switching means is closed.

Switching means SM2 is controlled by the two states "armed" or "disarmed" of the emergency door opening system. In the "armed" state the switching means SM2 is open. No power supply to the actuators is therefore possible. In the "disarmed" state, switching means SM2 is closed. Only when both switching means SM1 and SM2 are closed, i.e. with switching means SM1 controlled by the "park" state of the aircraft and switching means SM2 controlled by the "disarmed" state of the emergency door opening system, can actuators $A_1$, $A_2$, $A_3$, $A_4$ be supplied with power in order to be serviceable.

As a further option, an external communication means for the door control unit 6 can additionally be provided. This involves an operating console on both the outside and the inside of the aircraft door. These operating consoles (a common operating console 7 is illustrated) make possible external input of commands by hand and enable the testing and display of states of the door.

Command inputs can be, for example:

(71) switch power supply to door control unit on or off, (72) lock/unlock exterior hand lever, (73) initiate door opening operation or (74) initiate door closing operation.

Status displays can be, for example:

(75) display open position, (76) display closed position and locking of door, (77) display status of power supply, (78) display "locked" or (78.1) "unlocked" status of exterior hand lever or (79) display a fault in the door control system.

The coupling of the actuators to the movement mechanism and the dimensioning of the actuators are so configured that switching from an electromechanical to a manual operation of the control system, and vice versa, is possible. For this purpose the process program 61 contains or cooperates with a switch-over program 62 which makes possible the switch between electromechanical and manual operation.

For example, it is possible to control the closing operation of the door electromechanically and to carry out the subsequent opening operation in principle manually. The actuators are so configured that upon switching to manual operation, the required positioning forces can be manually generated, in comparison to a purely electromechanical door. With manual operation of the movement mechanism this operation is possible by means of the hand lever. If required, electromechanical actuators can be uncoupled by means of a coupling or clutch in the drive train, in order to avoid power or positioning-force losses in the actuators when switching to manual operation. Switching between mechanical and electromechanical operation of the control system should be possible at any desired function step of the process control system. The coupling and design of the actuators are, of course, so configured that all the safety requirements of the door are also fulfilled during manual operation.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A method of controlling the closing and opening operation of a passenger door of an aircraft, comprising a control system with at least one control unit for the actuators for moving the door and for moving closing and opening means, the door being movably arranged on a support arm and the support arm being pivotable around an axis fixed to the aircraft fuselage, characterized in that at least one control unit (8) for actuators is controlled by a door control unit (6) which optionally also can switch all or individual function steps optionally between a mechanical control and an electromechanical control, can control and display testing of door security, is controllable by manual command input by means of the operating console (7) arranged on the door.

2. A method of controlling a closing and opening operation of a door system including a passenger door of an aircraft, and including latching and locking mechanisms for selectively latching, unlatching, locking and unlocking said door, electromechanical actuators for moving said door and for actuating said latching and locking mechanisms, manual actuating means for moving said door and for actuating said latching and locking mechanisms, an actuator control unit for controlling said actuators, a door control unit for controlling said actuator control unit, and an operating console, wherein said method comprises the following steps:

a) moving said door from an open position to a closed position;

b) latching said door into a latched condition in said closed position;

c) locking said door from said latched condition to a locked condition in said closed position;

d) unlocking said door from said locked condition back to said latched condition;

e) unlatching said door from said latched condition to an unlatched condition in said closed position; and f) moving said door from said closed position to said open position;

wherein said door control unit controls a performance of each one of said steps a), b), c), d), e) and f), and selectively enables any selected one or more of said steps a), b), c), d), e) and f) to be carried out selectively by means of said electromechanical actuators or by means of said manual actuating means.

3. The method according to claim 2, comprising carrying out said steps with a selected one of said steps being carried out by means of at least one of said electromechanical actuators, and thereafter carrying out said steps with said selected one of said steps being carried out by means of at least one of said manual actuating means.

4. The method according to claim 2, further comprising carrying out, controlling, and displaying results of testing of a door security status.

5. The method according to claim 4, wherein said testing comprises testing of a flight or a park status of said aircraft, testing of an armed or disarmed status of an emergency opening system of said door system, and testing of a locked or unlocked status of a hand lever of said door system.

6. The method according to claim 4, wherein said testing comprises testing of a retracted or extended status of a set of boarding stairs of said door system.

7. The method according to claim 2, further comprising controlling said door control unit in response to manual commands input into said operating console.

8. The method according to claim 2, further comprising executing a process program stored in said door control unit to control said performance of said steps.

9. The method according to claim 2, wherein said latching and locking mechanisms include a flight locking mechanism, said door further includes a hand lever, and said door control unit controls said flight locking mechanism dependent on a position of said hand lever.

10. The method according to claim 2, wherein said door system further includes a power supply, first and second switching means connected in series between said power supply and said actuator control unit, and an emergency door opening system, and further comprising monitoring and controlling said first and second switching means responsive to a status of said emergency door opening system and a park or flight status of said aircraft.

11. The method according to claim 10, wherein at least one of said switching means is opened when said status of said emergency door opening system is an armed state or when said status of said aircraft is a flight state, so that a supply of power from said power supply to said actuator control unit is cut off.

12. The method according to claim 2, wherein said door system further includes a display unit, a power supply, and an exterior door lever, and said method further comprises inputting a display command into said operating console and responsively thereto selectively displaying on said display unit at least one of a state of said door being in said open position, a state of said door being in said closed position in said locked condition, an on or off state of said power supply, a locked state of said exterior door lever, an unlocked state of said exterior door lever, and fault condition in said actuator control unit, said door control unit or said operating console.

13. The method according to claim 2, further comprising executing a process program and a switch-over program in connection with said process program in said door control unit, and switching over from carrying out said steps by means of said electromechanical actuators to carrying out said steps by means of said manual actuating means, or vice versa, responsively to said executing of said programs.

14. The method according to claim 2, further comprising executing a process program in said door control unit, and upon completion of each one of said steps by means of either said electromechanical actuators or said manual actuating means, enabling a switch-over from said electromechanical actuators to said manual actuating means or vice versa for carrying out a next successive one of said steps, responsive to a command input via said operating console or responsive to said executing of said program.

15. A door system of an aircraft comprising:

a door movably arranged relative to a door opening;

a latching mechanism adapted to selectively latch and unlatch said door;

a locking mechanism adapted to selectively lock and unlock said door; electromechanical actuators adapted to move said door and to actuate said latching mechanism and said locking mechanism;

manual actuators adapted to move said door and to actuate said latching mechanism and said locking mechanism;

an actuator control unit connected for control signal transmission to said electromechanical actuators;

a door control unit connected for signal and data exchange with said actuator control unit;

plural sensors connected for signal transmission to said door control unit;

an operating console connected for signal and data exchange with said door control unit;

a power supply source connected to supply power to said actuator control unit; and first and second power switches connected in series between said power supply source and said actuator control unit.

16. The door system according to claim 15, further comprising an emergency door opening system and a set of boarding stairs, wherein said manual actuators include an exterior hand lever and an interior hand lever and said locking mechanism includes a locking mechanism for said exterior hand lever and a master locking mechanism for said interior hand lever, wherein said door is arranged to be swivellable as well as raisable and lowerable relative to said door opening, and wherein said plural sensors include a sensor arranged to sense at least one end position of a swivelling movement of said door, a sensor arranged to sense at least one end position of a raising or lowering movement of said door, a sensor arranged to sense a locked or unlocked status of said latching mechanism, a sensor arranged to sense a locked or unlocked status of said locking mechanism for said exterior hand lever, a sensor arranged to sense a locked or unlocked status of said master locking mechanism for said interior hand lever, a sensor arranged to sense an armed or disarmed status of said emergency door opening system, and a sensor arranged to sense a retracted or extended status of said set of boarding stairs.

17. The door system according to claim 16, wherein said second power switch is connected to said sensor arranged to sense said armed or disarmed status of said emergency door opening system so as to receive control signals therefrom.

18. The door system according to claim 15, further comprising an external control system onboard the aircraft, wherein said first power switch is connected to at least one of said operating console and said external control system to receive control signals therefrom.

19. The door system according to claim 15, wherein said door control unit has a process program stored therein and is adapted to execute said process program for controlling a sequence of operations for closing and opening said door.

20. The door system according to claim 19, wherein said process program includes a switch-over program, which can be executed to switch from an electromechanical control of functions of said door using said electromechanical actuators to a manual control of said functions of said door using said manual actuators, or vice versa.

\* \* \* \* \*

UNITED STATES PATENT AND TRADEMARK OFFICE
CERTIFICATE OF CORRECTION

PATENT NO.     : 6,467,729 B2
DATED          : October 22, 2002
INVENTOR(S)    : Buchs et al.

It is certified that error appears in the above-identified patent and that said Letters Patent is hereby corrected as shown below:

Column 4,
Line 36, before "DESCRIPTION", insert -- DETAILED --;

Column 6,
Line 4, after "or", replace "f light" by -- flight --;

Column 7,
Lines 5 to 9, replace the paragraph to read as follows:
-- In case the door is closed from outside in preparation for
parking the aircraft, the function step:
    key lock door, i.e. lock exterior hand lever
would alternatively replace the preceding, last step (flight lock
door). --;
Line 40, after "The", replace "abovementioned" by -- above-mentioned --;

Column 9,
Line 16, after "Actuator", replace "As" by -- $A_5$ --;

Column 11,
Line 63, after "and" insert -- a --.

Signed and Sealed this

Eighteenth Day of February, 2003

JAMES E. ROGAN
*Director of the United States Patent and Trademark Office*